(12) United States Patent
Subburaj et al.

(10) Patent No.: US 9,395,444 B2
(45) Date of Patent: Jul. 19, 2016

(54) MITIGATION OF SPURIOUS SIGNALS IN GNSS RECEIVERS

(71) Applicant: Texas Instruments Incorporated, Dallas, TX (US)

(72) Inventors: Karthik Subburaj, Bangalore (IN); Jawaharlal Tangudu, Bangalore (IN); Sumeer Bhatara, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 601 days.

(21) Appl. No.: 13/906,104

(22) Filed: May 30, 2013

(65) Prior Publication Data

US 2014/0354475 A1 Dec. 4, 2014

(51) Int. Cl.
*G01S 19/21* (2010.01)
(52) U.S. Cl.
CPC ........................................ *G01S 19/21* (2013.01)
(58) Field of Classification Search
CPC ................................. G01S 19/21; G01S 19/42

USPC ............... 342/357.2, 357.25, 357.46, 357.59; 375/317, 350

See application file for complete search history.

(56) References Cited

U.S. PATENT DOCUMENTS

2010/0201570 A1* 8/2010 Shemar et al. ........... 342/357.59
2014/0140440 A1* 5/2014 Sun et al. ..................... 375/316

* cited by examiner

*Primary Examiner* — Dao Phan
(74) *Attorney, Agent, or Firm* — John R. Pessetto; Frank D. Cimino

(57) ABSTRACT

A method of processing received satellite signals is provided. The method includes detecting frequency, power level, code phase and doppler frequency of a plurality of satellite signals and frequency and power level of a plurality of spurious signals. The plurality of spurious signals is ranked based on one or more ranking parameters. A first subset of the plurality of spurious signals which are ranked equal or above a threshold rank are processed through a plurality of notch filters and a second subset of the plurality of spurious signals which are ranked below the threshold rank are processed through a weeding filter.

20 Claims, 6 Drawing Sheets

MITIGATION OF SPURIOUS SIGNALS IN GNSS RECEIVERS

TECHNICAL FIELD

Embodiments of the disclosure relate to wireless receivers and more particularly to global navigation satellite system (GNSS) receivers.

BACKGROUND

Global navigation satellite systems (GNSS) are broadly defined to include GPS (U.S.), Galileo (proposed), GLONASS (Russia), Beidou (China), IRNSS (India, proposed), QZSS (Japan, proposed) and other current and future positioning technologies using signals from satellites, with or without augmentation from terrestrial sources. Information from GNSS is being increasingly used for computing a user's positional information (e.g., a location, a speed, a direction of travel, etc.).

In GNSS, multiple satellites may be present, with each transmitting a GNSS signal. A received signal at a GNSS receiver contains one or more of the transmitted GNSS signals. To obtain the information from the respective transmitted signals, the GNSS receiver performs a signal acquisition/tracking procedure. More specifically, the GNSS receiver searches for the corresponding transmitted signals in the received signal and then locks onto them for subsequent tracking of the corresponding satellites to receive the satellite information.

However, GNSS receivers are affected by interference in the form of spurious signals. These signals are caused by other wireless transmitters and receivers co-existing in the cell-phone platform or other noise sources including the digital processors of the GNSS receiver. Spurious signals or Spurs considered in this description are narrow-band interferers in the GNSS signal frequency band. The term spur and spurious signal has been used interchangeably in this disclosure.

Spurs degrade the overall sensitivity of the GNSS receiver. More importantly, the presence of spurs in the received spectrum also results in erroneous determination of position and velocity of a user by the GNSS receiver. Modern multi-constellation GNSS receivers are highly susceptible to this problem due to their wide RF frequency spectrum and presence of other radios on a shared chip or circuit board. Thus, there is a requirement for a GNSS receiver that mitigates the effect of spurious signals.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides a method of detecting and tracking GNSS (Global navigation satellite system) satellites. The method includes measuring a first set of parameters of one or more satellite signals and measuring a second set of parameters of one or more spurious signals. A GNSS receiver position and velocity is calculated from the first set of parameters and the second set of parameters of at least one spurious signal that is not processed in a notch filter module.

An example embodiment provides a method of processing received satellite signals. The method includes detecting frequency, power level, code phase and doppler frequency of a plurality of satellite signals and frequency and power level of a plurality of spurious signals. The plurality of spurious signals is ranked based on one or more ranking parameters. A first subset of the plurality of spurious signals which are ranked equal or above a threshold rank are processed through a plurality of notch filters and a second subset of the plurality of spurious signals which are ranked below the threshold rank are processed through a weeding filter.

Another example embodiment provides a global navigation satellite system (GNSS) receiver. The receiver includes a detection module configured to detect a plurality of satellite signals and a plurality of spurious signals. The detection module is configured to measure the frequency, power level, code phase and doppler frequency of the plurality of satellite signals and frequency and power level of the plurality of spurious signals. A ranking module is coupled to the detection module. The ranking module ranks the plurality of spurious signals based on one or more ranking parameters. A notch filter module is coupled to the ranking module and configured to receive the plurality of satellite signals and the plurality of spurious signals. The notch filter module processes a first subset of the plurality of spurious signals that are ranked equal or above a threshold rank. A weeding filter is coupled to the notch filter module and the ranking module. The weeding filter processes a second subset of the plurality of spurious signal that are ranked below the threshold rank.

An embodiment provides a computing device that includes a processing unit, a memory module and a receiver receiving a plurality of satellite signals from the plurality of satellites. The receiver includes a detection module configured to detect a plurality of satellite signals and a plurality of spurious signals. The detection module is configured to measure the frequency, power level, code phase and doppler frequency of the plurality of satellite signals and frequency and power level of the plurality of spurious signals. A ranking module is coupled to the detection module. The ranking module ranks the plurality of spurious signals based on one or more ranking parameters. A notch filter module is coupled to the ranking module and configured to receive the plurality of satellite signals and the plurality of spurious signals. The notch filter module processes a first subset of the plurality of spurious signals that are ranked equal or above a threshold rank. A weeding filter is coupled to the notch filter module and the ranking module. The weeding filter processes a second subset of the plurality of spurious signal that are ranked below the threshold rank.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
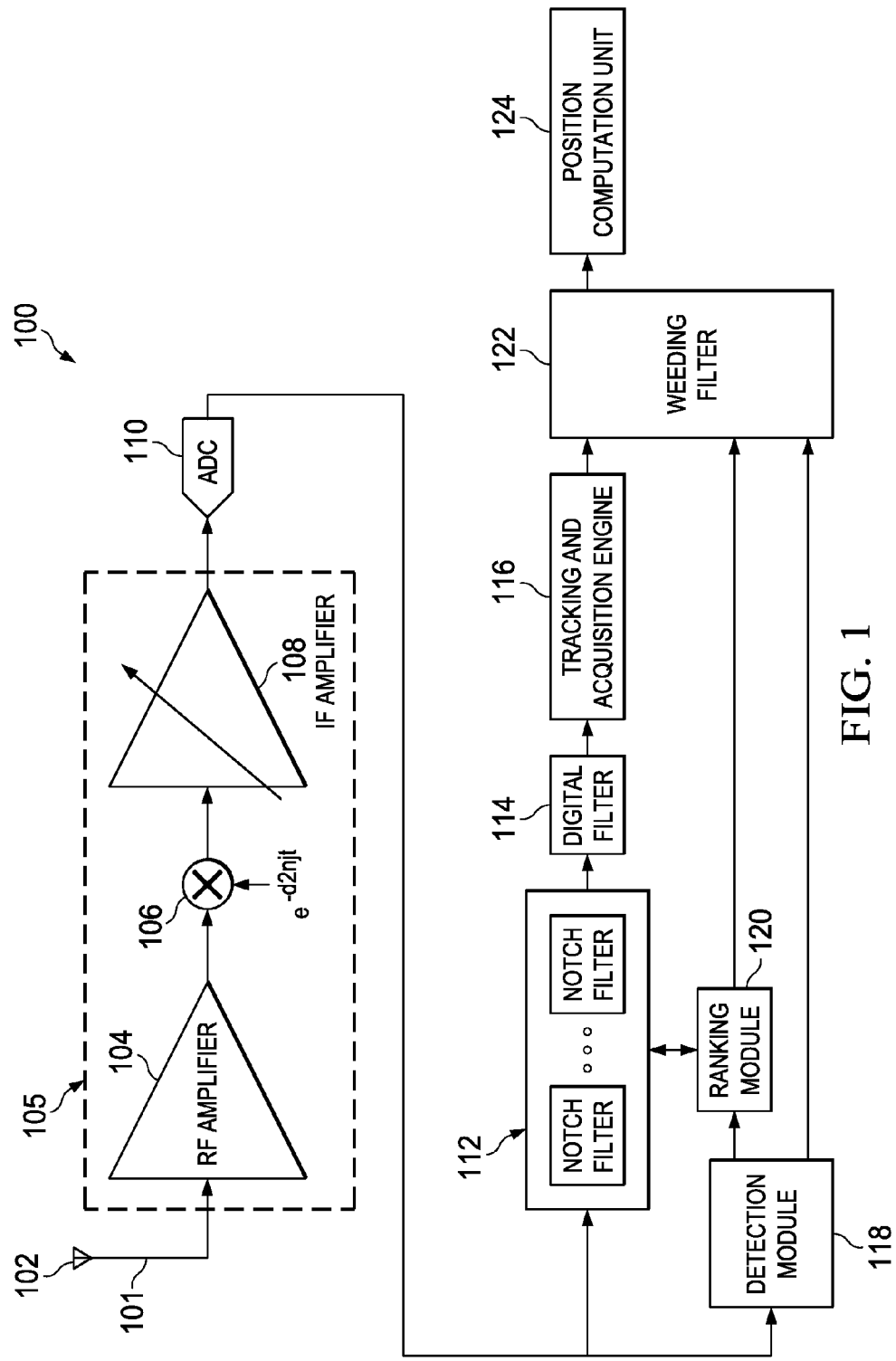
FIG. 1 illustrates a schematic of a global navigation satellite system (GNSS) receiver, according to an embodiment.

FIG. 1 illustrates a schematic of a global navigation satellite system (GNSS) receiver 100, according to an embodiment. The GNSS receiver 100 is configured to receive a plurality of satellite signals from a plurality of GNSS satellites. The GNSS satellites are man-made earth orbiting devices used for receiving or transmitting signals. The GNSS receiver in one embodiment receives GNSS satellite signals from multiple satellites belonging to multiple satellite systems such as a Global positioning system (GPS), a Global navigation satellite system (GLONASS) and the like, and which are commonly referred to as GNSS.

A received signal at the GNSS receiver 100 contains a plurality of satellite signals. Each GNSS satellite has a unique pseudorandom number (PN) code. For example, in GPS, each GNSS satellite repeatedly transmits a unique 1023 bit PN code of duration 1 millisecond. The GNSS receiver 100 generates local signals and modulates each local signal with the unique PN code corresponding to the each GNSS satellite signals to produce replica local signals. The received signal is then matched with the replica local signals to detect presence of corresponding GNSS satellite signal for subsequent tracking of the corresponding GNSS satellite to receive satellite information. After locking onto or acquiring a minimum of four GNSS satellites, the GNSS receiver 100 computes a user position and velocity by triangulation. The computation of the user position may include one or more operations known to those skilled in the relevant art and is not discussed here for simplicity of the description.

The satellite signal for example GPS signal are very low power (−130 dBm to −160 dBm). Spurious signals or Spurs in the satellite signal band cause false detection of satellites. Other radios such as Bluetooth, wireless LAN, FM transceivers and the digital processors of GNSS receiver itself on the same device cause spurs in the satellite band. In one embodiment, the GNSS receiver 100 has 40 MHz receive bandwidth, so there is a high probability of one or more spurs falling in this band. This causes false detection of satellites or totally prevents a local determination. The combination of all satellite signals and the spurs (present in the satellite signal bands) is herein referred to as received satellite signal 101.

The GNSS receiver 100 in FIG. 1 incudes an antenna 102 and an RF (radio frequency) amplifier 104 coupled to the antenna 102. A multiplication unit 106 receives output of the RF amplifier 104. The multiplication unit 106 is coupled to an IF (intermediate frequency) amplifier 108. The RF amplifier 104, multiplication unit 106 and the IF amplifier 108 constitutes a front end processing block 105. An ADC (analog to digital converter) 110 receives output of the IF filter. A notch filter module 112 is coupled to the ADC 110. The notch filter module 112 includes a plurality of notch filters. A digital filter 114 is coupled to the notch filter module 112. A tracking and acquisition engine 116 receives output of digital filter 114. A detection module 118 is coupled to the ADC 110. In one of the embodiment, the detection module 118 is coupled to the notch filter module 112 instead of ADC 110. A ranking module 120 is coupled to the detection module 118 and notch filter module 112. A weeding filter 122 receives output of the tracking and acquisition engine 116, the ranking module 120 and the detection module 118. A position computation unit 124 receives output of the weeding filter 122.

The operation of the GNSS receiver 100 illustrated in FIG. 1 is now explained. The antenna 102 is configured to receive plurality of satellite signals from GNSS satellites in one or more satellite systems such as GPS, GLONASS, Galileo and the like. The RF amplifier 104 receives the received satellite signal 101. The RF amplifier 104 removes unwanted input frequencies from the received satellite signal 101 and amplifies the received satellite signal 101 using filters and a low noise amplifier downconverts the received satellite signal 101 to a lower frequency. The multiplication unit 106 multiplies the signal received from RF amplifier 104 with $e^{(-j2\pi ft)}$ to synchronize with a characteristic PN code of a corresponding satellite. The IF amplifier 108 receives output of the multiplication unit 106. The IF amplifier 108 is configured to perform one or more level of down conversion of the signal received from the multiplication unit 106 to a lower frequency (intermediate frequency) signal. In addition, the IF amplifier 108 remove unwanted harmonics using filters and amplifies the resulting IF signal.

The IF signal from the IF amplifier 108 is received at ADC 110. The ADC 110 is configured to sample the signal to generate a plurality of corresponding digital samples. The sampling rate of ADC 110 is selected to be sufficiently high such that the PN code and data information in the IF signal is preserved. The ADC 110 is configured to provide the plurality of samples corresponding to the IF signal to the notch filter module 112 and the detection module 118. The notch filter module 112 includes a plurality of notch filters. A notch filter is used to filter a spurious signal or spur. An example transfer function of a notch filter is:

$$H(z)=(1-2\cos\omega_o z^{-1}+z^{-2})/(1-2R\cos\omega_o z^{-1}+R^2 z^{-2})$$

Where R and $R^2$ are constants that determine the notch filter bandwidth and $\cos w_o$ programs the notch filter frequency. However, to reduce the satellite signal energy loss, the notch filter bandwidth is of minimum value. The parameters R, $R^2$ and $\cos w_o$ are represented by relatively large number of bits so that only spurious signal is eliminated and also to minimize loss of signal energy. Each notch filter requires large silicon area. In one embodiment, each notch filter includes 10 k gates and consumes 0.5 mW of power. Therefore, an object of this invention is to use less number of notch filter by using notch filters for eliminating high power spurious signals while the low power spurious signals are eliminated using properties of satellite PN sequence.

The detection module 118 detects the presence of spurious signals in the received signal from ADC 110. In one embodiment, the GNSS receiver 100 includes plurality of detection modules. In an example embodiment, the plurality of samples from the ADC 110 is processed to determine if one or more spurious signals are present. When a spurious signal is detected, the frequency of the spurious signal is determined. Then the input spectrum is shifted such that the spurious signal is at 0 Hz. In some embodiments, a frequency locked loop (FLL) is used to track the spurious signal to compensate for any shifting or drifting in the spurious signal. FLL based tracking of spurious signal instead of tracking using repeated FFT (Fast Fourier transform) of ADC output, increases efficiency. In one embodiment, the detection module 118 is coupled to the notch filter module 112 instead of ADC 110. A set of spurs are assigned to the plurality of notch filters in the notch filter module 112 whereas the detection module 118 detects new spurs or spurious signals which have not been assigned to notch filter module 112. The process of detecting spurious signal by the detection module 118 is described in detail with reference to FIG. 2.

The ranking module 120 ranks the plurality of spurious signals detected by the detection module 118. The ranking module 120 continuously monitors the frequency and power level of spurious signals detected by the detection module 118 and the frequency and power level of spurious signals which are currently being filtered by the notch filter module 112. The ranking module 120 dynamically updates the rank of spurious signals based on the continuous monitoring. The ranking module 120 ranks the plurality of spurious signals based on one or more ranking parameters. In an example embodiment, the ranking parameters are pre-defined in a GNSS receiver 100. In one embodiment, a user can select a set of ranking parameters from the plurality of available ranking parameters. This set of ranking parameters is received by the ranking module 120 to rank the plurality of spurious signals. Examples of ranking parameters include, but are not limited to, power level of spurious signal, frequency of spurious signal, power level of satellite signal, frequency of satellite signal, code phase, doppler frequency of satellite signal, coherent integration duration of satellite signal, attenuation level of spurious signal with respect to a satellite, satellite band, and the like.

The ranking module 120 estimates a cost associated with each ranking parameter. An optimized cost is calculated by multiplying the cost with a respective weight assigned to each ranking parameter. The optimized cost obtained for all ranking parameters is summed to calculate an all-inclusive cost of each spurious signal. The plurality of spurious signals is sorted based on the calculated all-inclusive cost to obtain the rank of the plurality of spurious signals. The notch filter module 112 is configured to process a first subset of the plurality of spurious signals that are ranked equal or above a threshold rank. The weeding filter 122 is configured to process a second subset of the plurality of spurious signals that are ranked below the threshold rank. In one embodiment, the weeding filter 122 process a subset of the plurality of spurious signals which are detected but not filtered by the notch filter module 112. In one embodiment, the threshold rank is pre-defined for GNSS receiver 100. In an example embodiment, the threshold rank is equal to number of notch filters in the notch filter module 112. In one embodiment, a sub-module associated with the ranking module 120 estimates the cost of each ranking parameter and calculates the all-inclusive cost. The process of ranking the plurality of spurious signals by the ranking module 120 is described in detail with reference to FIG. 3.

The digital filter 114 removes any signal which is beyond the region of interest of GNSS receiver 100. For example, if the GNSS receiver 100 is used to track frequencies in the range of 1575±10 MHz then the digital filter 114 would remove a signal of frequency 1600 MHz. A received satellite signal 101 at a GNSS receiver 100 contains one or more of the transmitted GNSS signals. To obtain the information from the respective transmitted signals, the GNSS receiver 100 performs a signal acquisition/tracking procedure through the tracking and acquisition engine 116. More specifically, the tracking and acquisition engine 116 searches for the corresponding transmitted signals in the plurality of samples from the ADC 110 and then locks onto them for subsequent tracking of the corresponding satellites to receive the satellite information. The signal acquisition/tracking procedure includes correlating a sample from the ADC 110 with a corresponding local signal generated within the GNSS receiver 100. For example, in GPS satellite system, each GNSS satellite repeatedly transmits a unique 1023 bit PN code of duration 1 millisecond. The GNSS receiver 100 generates local signals and modulates each local signal with the unique PN code corresponding to the each GNSS satellite signals to produce replica local signals. The plurality of samples from the ADC 110 is then matched with the replica local signals to detect presence of corresponding GNSS satellite signal for subsequent tracking of the corresponding GNSS satellite to receive satellite information. After locking onto or acquiring a minimum of four GNSS satellites, the position computation unit 124 computes a user position and velocity by triangulation. The computation of the user position may include one or more operations known to those skilled in the relevant art and is not discussed here for simplicity of the description.

A weeding filter 122 is coupled to the tracking and acquisition engine 116, the ranking module 120 and the detection module 118. The tracking and acquisition engine 116 provides satellite signal measurements of each satellite signal to the weeding filter 122. The satellite signal measurements include, but are not limited to, frequency, power level, and coherent integration duration of each satellite signal. In one embodiment, the tracking and acquisition engine 116 provides a subset of satellite signal measurements to the weeding filter 122. The notch filters in the notch filter module 112 cannot eliminate all the spurious signals present in the received satellite signal 101. The high power consumption of notch filters in addition to the increased area occupied by notch filters prohibits their use in large numbers in an Integrated Circuit. A set of values received from tracking and acquisition engine 116, in one embodiment, includes spurious signal measurements. The spurious signal measurements include, but not limited to, frequency and power level of the plurality of spurious signals. In one embodiment, the weeding filter receives spurious signal measurements of unfiltered spurious signals. The ranking module 120 continuously monitors the frequency and power level of spurious signals detected by the detection module 118 and the frequency and power level of spurious signals which are currently being filtered by the notch filter module 112. The ranking module 120 provides weeding filter 122 a list of spurious signals which are ranked below the threshold rank. The detection module 118 provides the attenuation information corresponding to a set of spurious signals that are ranked below the threshold rank to the weeding filter 122. In one embodiment, the detection module 118 provides the total attenuation information of the unfiltered spurious signals. In one embodiment, the detection module 118 provides attenuation information of all the spurious signals detected by the detection module 118.

The weeding filter 122 is used to mitigate the adverse effects of the unfiltered spurious signals on the estimates of user position and velocity by the GNSS receiver 100. In an example embodiment, the weeding filter 122 assigns weights to the satellite signal measurements. If the unfiltered spurious signals are used in the position computation unit 124, then it would result in false reporting of the user position and velocity. Therefore, the weeding filter 122 prevents the position computation unit 124 from using corrupt signal measurements for triangulation. In some embodiments, the position computation unit 124 receives Doppler frequency, code phase and power level measurements corresponding to the plurality of satellite signals from the weeding filter. The position computation unit 124 computes the user's position and velocity by applying a transformation on the Doppler frequency and code-phase measurements of the plurality of satellites. The position computation unit 124 processes the measurements from different satellites based on one or more factors to combine them to calculate the user's position and velocity. The one or more factors include at least one of power level measurements, code phase and frequency measurements. In one embodiment, the one or more factors include the weights given to each satellite signal measurement by the weeding filter. The weeding filter is described in detail with reference to FIG. 7.

Figure 2:
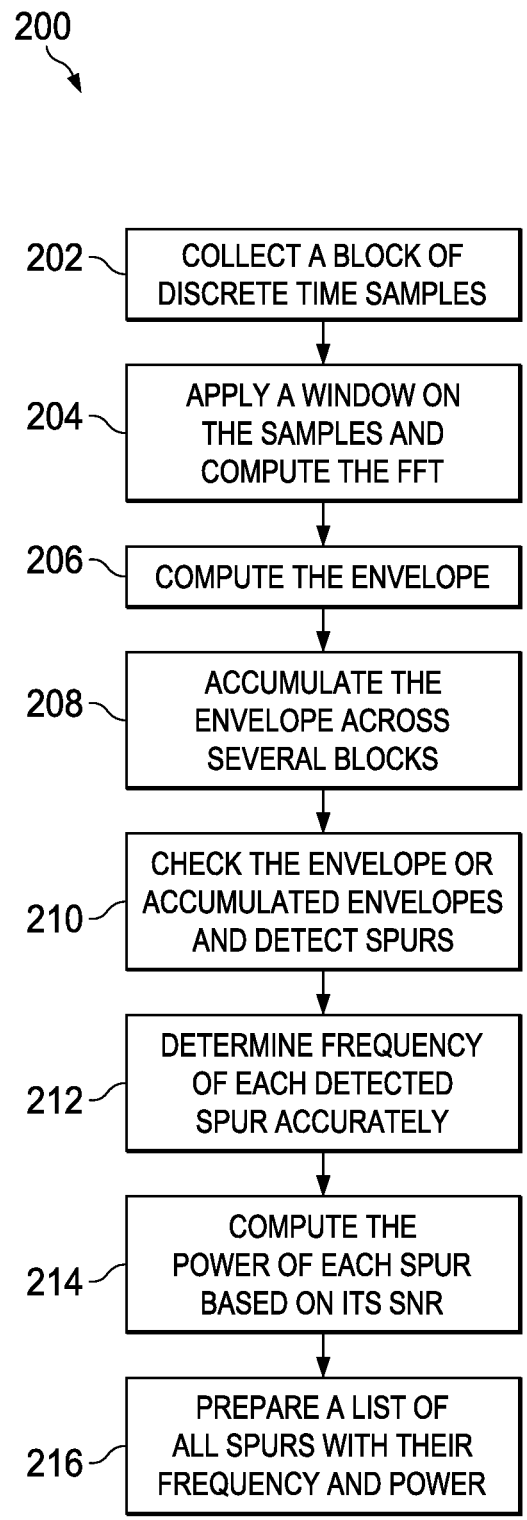
FIG. 2 is a flowchart illustrating a method of detecting spurious signals, according to an embodiment.

FIG. 2 is a flowchart 200 illustrating a method of detecting spurious signals, according to an embodiment. The detection module 118 detects the presence of spurious signals in the plurality of samples from the ADC 110. In one embodiment, the GNSS receiver 100 includes plurality of detection modules. The plurality of samples from ADC 110 is analyzed for presence of spurious signals. At step 202, blocks of discrete time domain complex ADC data are collected. The blocks are transferred into frequency domain by applying a window on the block of digital samples and computing FFT (Fast fourier transform) on the window data, at step 204. The window data undergoing FFT is termed as FFT bin. At step 206, the envelope of the FFT output is computed. At step 208, the process of collecting input discrete time complex ADC data, performing FFT and computing envelope (Step 202 to Step 206) is repeated over several data blocks and the envelopes of each block are accumulated. The step 208 improves probability of detecting spurious signals. At step 210, the accumulated envelopes of each block are analyzed for detection of spurious signals. The FFT bins which satisfy the criteria that the ratio of the difference between its accumulated envelope and mean envelope of its neighboring bins, to the standard deviation of noise bins is above a pre-defined threshold are considered to be containing a spurious signal or spur. The respective bin locations give approximate spurious signal frequency which is contained in the bin.

At step 212, the frequency of each spurious signal is determined accurately. The accumulated envelope is shifted using a digital mixer based frequency shifter, so as to place the spurious signal near 0 Hz and the signal is decimated to a smaller sampling rate. Thereafter, FFT with smaller sampling frequency is performed. This provides frequency estimation with a finer frequency resolution. The exact spurious signal frequency is estimated by quadratic interpolation of the FFT results. At step 214, the exact power of each spurious signal is computed by processing the FFT output and noise power spectral density. The spurious signal detection process in the detection module 118 runs continuously and maintains a list of spurious signals along with their frequency and power levels (step 216). In one embodiment, the detection module 118 is coupled to the notch filter module 112 instead of ADC 110. A set of spurs are assigned to the plurality of notch filters in the notch filter module 112 whereas the detection module 118 detects new spurs or spurious signals which have not been assigned to notch filter module 112. The ranking module 120 ranks the list of spurious signals, generated in the detection module 118, as detailed with reference to FIG. 3.

Figure 3:
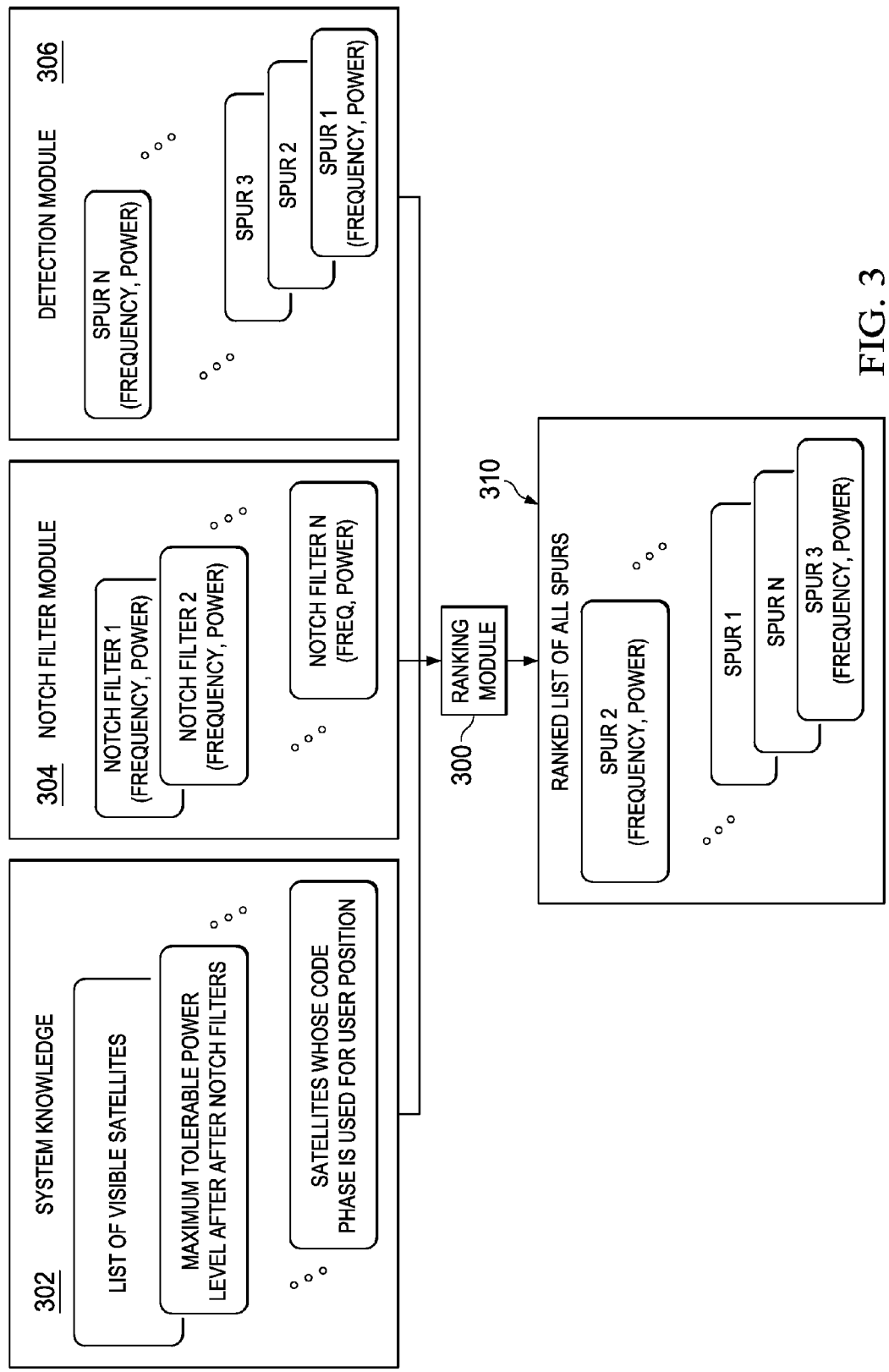
FIG. 3 illustrates functioning of ranking module, according to an embodiment.

FIG. 3 illustrates functioning of ranking module 300, according to an embodiment. The ranking module 300 is similar in connection and operation to the ranking module 120 illustrated in FIG. 1. The ranking module 300 receives one or more ranking parameters to rank a plurality of spurious signals. The ranking module 300 receives a list of system parameters 302 which include, but are not limited to, list of visible satellites, maximum tolerable power level of notch filters in the notch filter module 112, frequency and code phase measurement of the satellites currently used for tracking user position, and the like. The ranking module 300 also receives the frequency and power level of spurious signals 304 which are being filtered by the notch filter module 112. The ranking module 300 also receives the list of spurious signals 306 maintained by the detection module 118 along with the frequency and power level of the listed spurious signals. In an example embodiment, a user can select a set of ranking parameters to be used in GNSS receiver from a plurality of available ranking parameters.

The ranking module 300 estimates a cost associated with each ranking parameter. The ranking module 300 estimates a power cost of each spurious signal based on power level of the spurious signal. In an example embodiment, the ranking module 300 assigns a higher power cost to spurious signals with power level above a pre-defined power threshold and a lower power cost to spurious signals with power level below the pre-defined power threshold. The ranking module 300 estimates a frequency cost of each spurious signal based on frequency of spurious signal. In an example embodiment, the ranking module 300 estimates the frequency cost of each spurious signal based on frequency of spurious signal and frequency of FDMA (frequency division multiple access) slot of a visible satellite. A visible satellite is one whose frequency and code-phase measurements are being used for tracking user position. In an embodiment, the ranking module 300 assigns a low frequency cost to a spurious signal whose frequency is far from the frequency of FDMA slot of a visible satellite. The ranking module 300 estimates an attenuation cost of each spurious signal based on the attenuation of a spurious signal due to the RF filtering, IF filtering and tracking & acquisition of satellite signal. In an example embodiment, the ranking module 300 assigns a low attenuation cost to a spurious signal which has more attenuation than a pre-defined attenuation threshold. The ranking module 300 estimates a band cost of each spurious signal based on a satellite band in which the spurious is present. Examples of satellite band include, but are not limited to, GPS band, GLONASS band, Galileo band, and the like. In an example embodiment, a spurious signal in GPS band is assigned a higher cost than a spurious signal present in the GLONASS band, because the spurious signal in GPS band affects all the GPS satellites and corrupts frequency and code-phase measurements.

The ranking module 300 estimates one or more costs based on one or more ranking parameters. In an embodiment, the ranking module 300 estimates cost based on system parameters 302, frequency and power level of spurious signals 304 which are being filtered by the notch filter module 112, and the list of spurious signals 306 maintained by the detection module 118. In an example embodiment, a user selects a set of ranking parameters from the plurality of available ranking parameters. In another embodiment, a set of ranking parameters are pre-defined in the ranking module 300. Thereafter, the ranking module 300 calculates an optimized cost of each ranking parameter by multiplying the ranking parameter cost with a respective assigned weight to the ranking parameter. In an example embodiment, $w1$ is a weight assigned to the power level of a spurious signal, $w2$ is a weight assigned to the frequency of the spurious signal and $w3$ is a weight assigned to the attenuation of a spurious signal, the optimized power cost, optimized frequency cost and optimized attenuation cost of the spurious signal are:

$$\text{Optimized power cost} = \text{Power cost} * w1 \quad (1)$$

$$\text{Optimized frequency cost} = \text{Frequency cost} * w2 \quad (2)$$

$$\text{Optimized attenuation cost} = \text{Attenuation cost} * w3 \quad (3)$$

wherein $w1$, $w2$ are non-negative real numbers. In an embodiment, the weights are pre-defined in the ranking module 300 or a user dynamically updates the weights to achieve optimal performance of GNSS receiver.

The optimized cost is obtained for each ranking parameter from the estimated cost and assigned weight to the ranking parameter. The optimized cost obtained for all ranking parameters, in an embodiment, is summed to calculate an all-inclusive cost of each spurious signal. In an example embodiment, an all-inclusive cost of a spurious signal is defined as:

All-inclusive cost=Optimized power cost+Optimized frequency cost+Optimized attenuation cost+ . . .  (4)

Replacing values from equations (1), (2) and (3),

All-inclusive cost=Power cost*$w1$+Frequency cost*$w2$+Attenuation cost*$w3$+ . . .  (5)

In the above embodiment, the all-inclusive cost is a linear function of ranking parameter cost and the weights. In another embodiment, the all-inclusive cost is a non-linear function of ranking parameter cost and the weights.

In one embodiment, optimized cost of only those ranking parameters is considered for calculating the all-inclusive cost which are within a pre-defined range. In one embodiment, all-inclusive cost is computed in a way to achieve optimal performance of GNSS receiver. In an embodiment, one or more ranking parameters are not included for calculating the all-inclusive cost a spurious signal. The plurality of spurious signals is sorted based on the calculated all-inclusive cost of each spurious signal to obtain the rank of the plurality of spurious signals. A set of spurious signals which are ranked equal or above a threshold rank have high impact on system performance in terms of measurement of frequency and power level of satellite signals thus resulting in false reporting of user position and velocity. It should be noted, however, that the scope of the present disclosure is not limited to any or all of the embodiments of ranking disclosed herein. Indeed, one or more of the parameters, operations, or processes used for ranking of spurious signals in the disclosed embodiments may be removed, replaced, supplemented, or changed.

The plurality of spurious signals includes a first subset and a second subset of spurious signals. The first subset of the plurality of spurious signals which are ranked equal or above the threshold rank are processed through the notch filter module 112 whereas the second subset of the plurality of spurious signals which are ranked below the threshold rank are processed through a weeding filter 122. A GNSS receiver 100 has limited number of notch filters in the notch filter module 112 as they consume significant power and silicon area. In an embodiment, the threshold rank is less than or equal to the number of notch filters in the notch filter module 112. In an embodiment, the threshold rank is defined by a threshold power level of the spurious signals. Thus, only spurious signals which are equal or above the threshold power level are processed by the notch filter module 112. If all the detected spurious signals are below the threshold power level, then none of the spurious signal is assigned to the notch filter module 112. Thus, one of the features of this invention is less dependency on the notch filter module 112 for mitigation of spurious signals which results in less power consumption. If the ranking module 120 receives a new spurious signal from the detection module 118 whose all-inclusive cost is more than a lowest ranked spurious signal that is currently being filtered by the notch filters, then the new spurious signal is assigned to the notch filter module 112 for mitigation and the lower ranked spurious signal which was being filtered by the notch filter module 112 is passed to the weeding filter 122. In an embodiment, a time-hysteresis is provided between assignment of a spurious signal for mitigation by notch filter module 112 and its removal with a higher ranked spurious signal. This prevents frequent assignment and removal which may occur if multiple spurs with similar all-inclusive costs are detected by the detection module 118.

The GNSS receiver 100 uses limited number of notch filters because of their high power consumption in addition to the increased area occupied by notch filters. Thus, not all spurious signals falling in the satellite bands are mitigated through notch filters. A set of signal measurements received from tracking and acquisition engine 116 may include erroneous measurements due to unfiltered spurious signals at their inputs. The weeding filter 122 is used to mitigate the adverse effects of the erroneous measurements due to the unfiltered spurious signals on the estimates of user position and velocity by the GNSS receiver 100. If the erroneous measurements from tracking and acquisition engine 116 due to unfiltered spurious signals are used in the position computation unit 124, then it would result in false reporting of the user position and velocity. The weeding filter is described in detail with reference to FIG. 7. The filters in front end processing block 105 provides attenuation to out-of-band spurious signals but pass the in-band GPS and GLONASS spurious signals unattenuated. These in-band spurious signals also undergo attenuation in GNSS receiver signal processing. A brief description of different types of attenuation in GNSS receiver which follows forms the basis of functioning of weeding filter 122.

Figure 4:
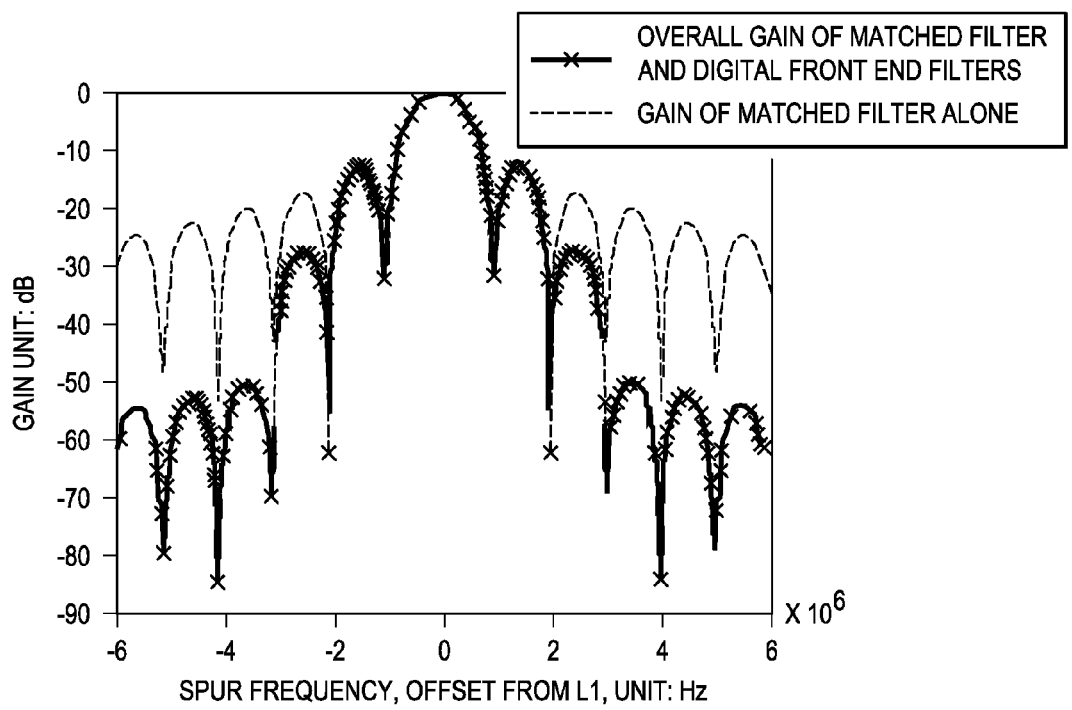
FIG. 4 illustrates the matched filter and digital front end filter's sinc shaped spectrum according to an embodiment.

Front-end and matched filter attenuation: The satellite signal is expected to be centered at a frequency corresponding to a GPS L1 frequency (center frequency) in case of GPS band and respective FDMA slot frequencies in case of GLONASS band. In one embodiment, the GPS L1 frequency is 1575.42 MHz. The power-spectral-density of satellite signal is expected to follow a sinc-squared profile, with nulls at the chipping rate and 99% is concentrated in the main and the first side lobes. In one embodiment, GPS has 1.023 MHz offset from the center frequency and GLONASS has 0.511 MHz offset from the center frequency. The filters in the front end processing block 105 attenuate satellite signal and noise including any spurious signal far away from the main lobes. The attenuation is much higher for the lobes which are away from the center frequency. A GNSS receiver includes matched filters to extract the satellite PN signals. The matched filters also have a sinc-squared power-spectral-density about the satellite center frequency. Hence, the front end filters and matched filters attenuate the spurious signals in the received satellite signal 101 with the exact attenuation dependent on the offset of the spurious signal frequency from the satellite center frequency, as shown in FIG. 4 as an example. These attenuations caused by the matched filter and the front end filters are denoted by $Atten_{MF}$ and $Atten_{FE}$ respectively.

Figure 5:
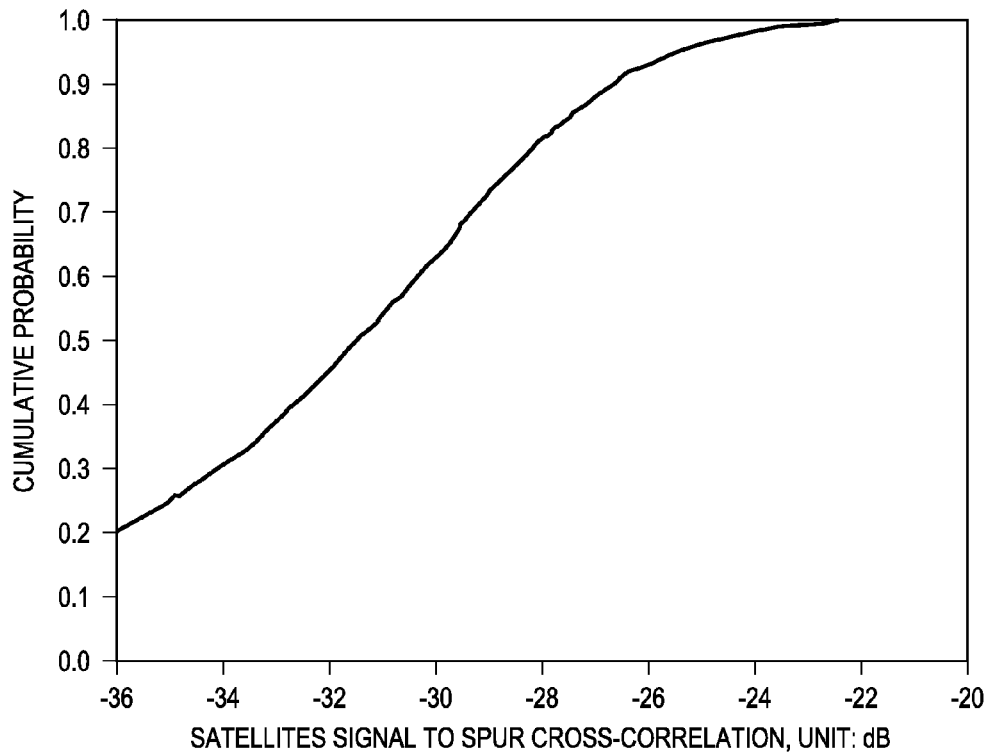
FIG. 5 illustrates a CDF (cumulative distribution function) of the attenuation for a GPS satellite system, according to an embodiment.

PN (Pseudo-random) code cross-correlation based attenuation: An important part of GNSS satellite signal processing is correlation of the received satellite signal with the satellite's PN code sequences, which have a periodicity of 1 ms. This causes spurious signals to be misinterpreted as attenuated satellite signals at doppler frequencies which are offset by integer multiples of 1 kHz from the spurious signal frequency. The attenuation is due to the fact that the PN sequences consist of +1's and −1's, and their correlation with spurious signals of different frequencies (generated by the fourier series coefficients of PN sequences) is lesser than their auto-correlation at zero delay. The exact attenuation varies as a function of the satellite PN sequence and the offset of the spurious signal frequency from the satellite doppler frequency. The CDF (cumulative distribution function) of the attenuation for GPS, across frequency offsets is shown in FIG. 5 as an example. This attenuation is denoted by $Atten_{PN}$. In some embodiments, the exact PN code cross-correlation based attenuation may be computed in hardware with the knowledge of satellite signal doppler frequency, PN code and code phase and the spur frequency. In some embodiments, the worst case attenuation (minimum attenuation) across all possible combinations of these parameters may be pre-computed and stored for use as $\text{Atten}_{PN}$. These pre-computed and stored values may be different for different constellations. For example, in one of the embodiments, these values are 21 dB for GPS and 27 dB for GLONASS. These worst case values are pre-computed by observing the CDF of the attenuation for different constellations, such as shown in FIG. 5 as an example.

Figure 6:
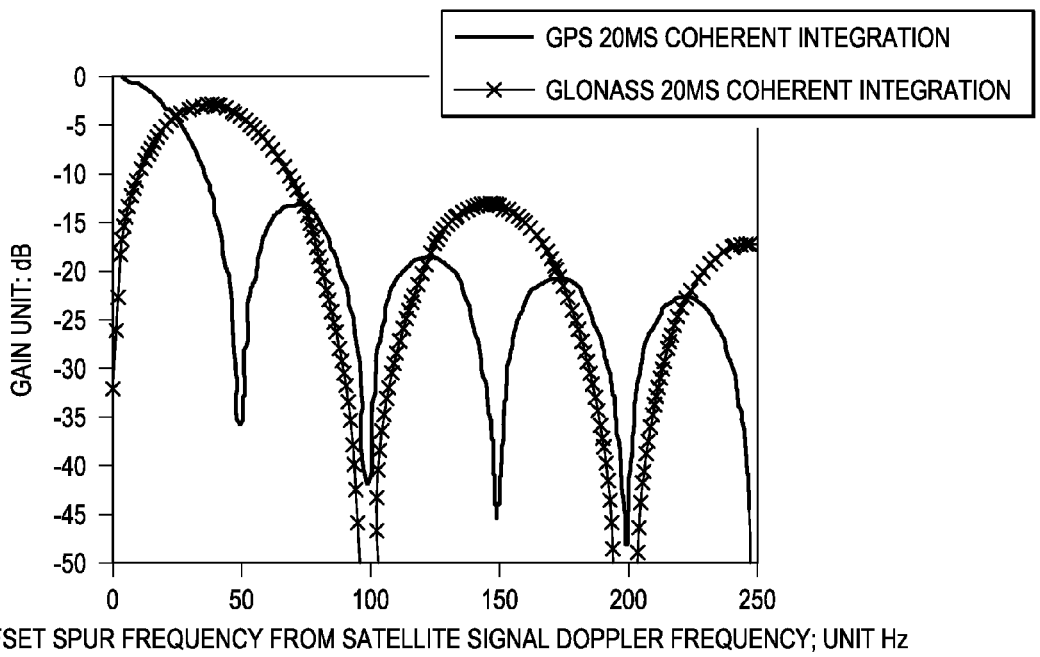
FIG. 6 illustrates a coherent integration caused attenuation of spurious signals for GPS and GlONASS satellite system, according to an embodiment.

Coherent Integration caused attenuation: Another important part of GNSS satellite signal processing is the coherent integration of received satellite signal 101 multiplied with a doppler frequency exponential, for durations such as $T_{CI}$=10 ms, 20 ms and beyond. This coherent integration ensures that spurious signals at offsets of $1/T_{CI}$ from the doppler frequency do not correlate with the signal and hence are totally attenuated. In general, the integration acts as another filter with sinc-squared shaped frequency spectrum, with nulls at multiples of $1/T_{CI}$. Example of coherent integration caused attenuation of spurs in case of 20 ms integration for GPS and GLONASS is illustrated in FIG. 6. This attenuation is denoted by $\text{Atten}_{CI}$.

The attenuation of each spurious signal is dependent on the frequency and power level of a satellite signal. Thus, the attenuation of a spurious signal with respect to one satellite may be different with respect to another satellite. Apart from the attenuation referred in previous paragraphs, the attenuation of spurious signal is dependent on, but not limited to, frequency of spurious signal, frequency of satellite signal, satellite band, FDMA slot, propagation delay of satellite signal, power-spectral-density of the satellite signal, and the like. In one embodiment, the total attenuation of spurious signal is given as:

$$\text{Atten}_{Total} = \text{Atten}_{MF} + \text{Atten}_{FE} + \text{Atten}_{PN} + \text{Atten}_{CI} + \ldots$$

In some GNSS receiver one or more of the attenuation are not considered for calculations. Corresponding to different satellite signals, each spur may have a different total attenuation. In some embodiments the highest or the lowest of these different attenuations is considered as the total attenuation of the spurious signal. In an example embodiment, the attenuation information of a spurious signal with respect to each visible satellite is maintained in the detection module 118 and provided to the ranking module 120 and weeding filter 122. This attenuation information is updated at regular intervals. In an embodiment, the attenuation information is maintained in a sub-module of GNSS receiver 100. The factors used by the ranking module 120 and weeding filter 122 for computing attenuation are same/different based on requirement of GNSS receiver 100. An effective signal strength of each spurious signal is calculated by subtracting the attenuation level of each spurious signal from the power level of each spurious signal.

Figure 7:
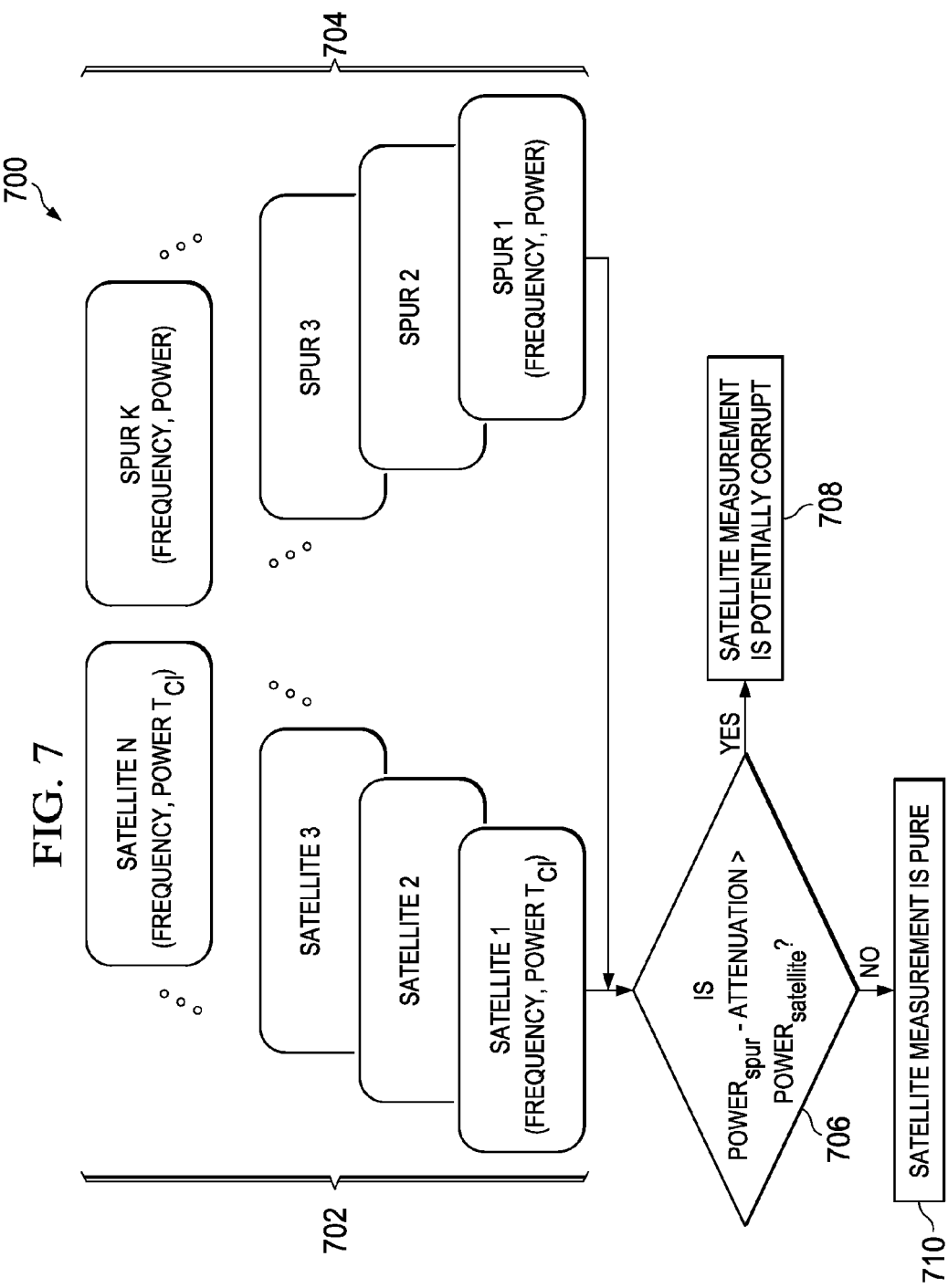
FIG. 7 illustrates a flowchart of weeding filter logic according to an embodiment.

FIG. 7 is a flowchart 700 illustrating weeding filter logic according to an embodiment. One of the objects of the weeding filter is to ensure that all the spurs which are detected but not filtered, do not corrupt the computation of user's position and velocity. The weeding filter 122 receives satellite signal measurements which include, but are not limited to, frequency, power level and coherent integration duration, $T_{CI}$, of each satellite signal of the one or more satellite signals (702). The weeding filter 122 also receives spurious signal measurements which include, but are not limited to, frequency and power level of each spurious signal of the one or more spurious signals (704). In one embodiment, the weeding filter 122 receives frequency and power level of all the spurious signals detected in GNSS receiver 100. In one embodiment, the weeding filter 122 receives and processes frequency and power level of unfiltered spurious signals. The weeding filter 122 also receives attenuation level of each spurious signal with respect to each satellite signal from the detection module 118. The attenuation level of each spurious signal is a function of at least one of frequency of spurious signal, power level of spurious signal, frequency of satellite signal and power spectral density of satellite signal. In one embodiment, the attenuation information is maintained by the weeding filter or received from a sub-module in GNSS receiver 100. An effective signal strength of each spurious signal is calculated by subtracting the attenuation level of each spurious signal from the power level of each spurious signal. At step 706, the weeding filter 122 compares the effective signal strength of each spurious signal with the power level of each satellite signal. The satellite signal for which power level measurement is less than the effective signal strength of any spurious signal of the plurality of spurious signals is discarded at step 708. These satellite signals are corrupted and hence not used for triangulation in determining user position and velocity. The power level measurement of all satellite signals are continually checked against the list of spurious signals assigned to the weeding filter 122. The satellite signals for which the power level measurement is greater than effective signal strength of any spurious signal in the list of spurious signal are considered pure and used for measurement of user position and velocity (step 710). The weeding filter 122 is used to mitigate the adverse effects of the unfiltered spurious signals on the estimates of user position and velocity by the GNSS receiver 100. If the unfiltered spurious signals are used in the position computation unit 124, then it would result in false reporting of the user position and velocity. Therefore, the weeding filter 122 prevents the position computation unit 124 to use corrupt signal measurements for triangulation.

In an example embodiment, the weeding filter 122 assigns weights to satellite signal measurements to the respective satellites. In one embodiment, the weights are assigned based on the satellite signal's Doppler frequency, code-phase measurements and other similar parameters. In one embodiment, the weights are assigned based on the power level measurement of each satellite signal and also the frequency and power level measurements of the spurious signals. In one embodiment, the weights assigned to satellite signal measurements, for which the power level measurement is not significantly higher than the effective signal strength of the spurious signals, are lowered, so as to reduce their affect on the final user's position and velocity computation. Typically, assigning a higher weight to a measurement causes it to have more affect on the final user's position and velocity computation than a measurement which is assigned a lower weight. In one embodiment, the weights assigned to satellite signal measurements, for which the power level measurement is not significantly higher than the effective signal strength of the spurious signals, are modified for optimum behavior of GNSS receiver 100.

Figure 8:
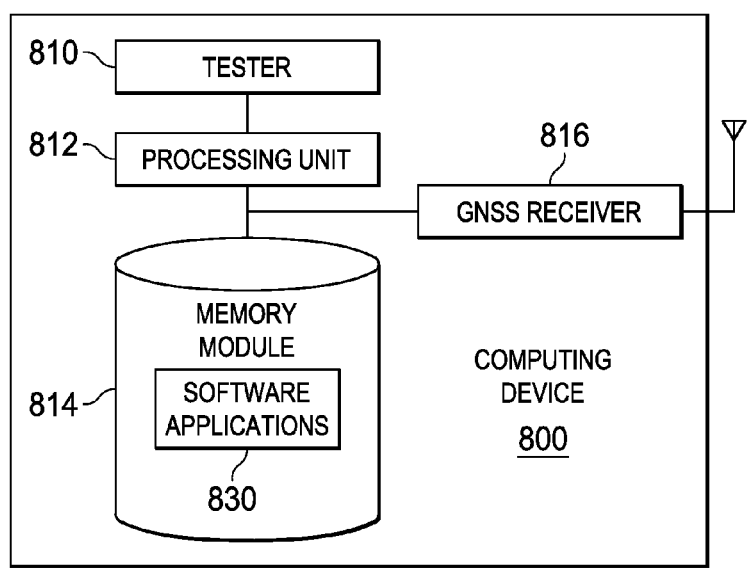
FIG. 8 illustrates a computing device with the GNSS receiver according to an embodiment.

FIG. 8 illustrates a computing device according to an embodiment. The computing device 800 is, or is incorporated into, a mobile communication device, such as a mobile phone, a personal digital assistant, a personal computer, or any other type of electronic system.

In some embodiments, the computing device 800 comprises a megacell or a system-on-chip (SoC) which includes a processing unit 812 such as a CPU (Central Processing Unit), a memory module 814 (e.g., random access memory (RAM)) and a tester 810. The processing unit 812 can be, for example, a CISC-type (Complex Instruction Set Computer) CPU, RISC-type CPU (Reduced Instruction Set Computer), or a digital signal processor (DSP). The memory module 814 (which can be memory such as RAM, flash memory, or disk storage) stores one or more software applications 830 (e.g., embedded applications) that, when executed by the processing unit 812, perform any suitable function associated with the computing device 800. The tester 810 comprises logic that supports testing and debugging of the computing device 800 executing the software application 830. For example, the tester 810 can be used to emulate a defective or unavailable component(s) of the computing device 800 to allow verification of how the component(s), were it actually present on the computing device 800, would perform in various situations (e.g., how the component(s) would interact with the software application 830). In this way, the software application 830 can be debugged in an environment which resembles post-production operation.

The processing unit 812 typically comprises a memory and logic which store information frequently accessed from the memory module 814. The computing device 800 includes GNSS receiver 816 which is capable of communicating with a plurality of satellites over a wireless network. The GNSS receiver 816 is used in detecting and tracking position and velocity of a user having the computing device 800. The GNSS receiver 816 is analogous to the GNSS receiver 100 in connections and operation. The GNSS receiver 816 requires less number of notch filters since the notch filters are used for eliminating high power spurious signals while the low power spurious signals are eliminated using properties of satellite PN sequence.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A method comprising:
 measuring a first set of parameters of one or more satellite signals;
 measuring a second set of parameters of one or more spurious signals;
 calculating a GNSS (Global navigation satellite system) receiver position and velocity from the first set of parameters and the second set of parameters of at least one spurious signal that is not processed in a notch filter module.

2. The method of claim 1, wherein the first set of parameters comprises at least one of frequency, power level, code phase and doppler frequency of one or more satellite signals.

3. The method of claim 1, wherein the second set of parameters comprises at least one of frequency and power level of one or more spurious signals.

4. The method of claim 1, wherein calculating the GNSS receiver position and velocity further comprises:
 ranking the one or more of spurious signals based on one or more ranking parameters;
 processing a first subset of one or more spurious signals which are ranked equal or above a threshold rank through the notch filter module, wherein the notch filter modules comprises a plurality of notch filters; and
 processing a second subset of one or more spurious signals which are ranked below the threshold rank through a weeding filter.

5. The method of claim 4, wherein ranking the one or more of spurious signals further comprises:
 receiving the one or more ranking parameters,
 assigning weights to one or more ranking parameters;
 estimating a cost associated with one or more ranking parameters;
 calculating an optimized cost of each ranking parameter from the estimated cost and assigned weight to the ranking parameter; and
 calculating an all-inclusive cost of a spurious signal from the calculated optimized costs of the one or more ranking parameters.

6. The method of claim 4, wherein processing the second subset of one or more spurious signals through the weeding filter comprises:
 receiving satellite signal measurements of each satellite signal of the one or more satellite signals, wherein the satellite signal measurements is at least one of frequency, power level, and coherent integration duration of a satellite signal;
 receiving spurious signal measurements of each spurious signal of the one or more spurious signals, wherein the spurious signal measurements is at least one of frequency and power level of a spurious signal;
 receiving attenuation level of each spurious signal with respect to each satellite signal, wherein the attenuation level of each spurious signal is a function of at least one of frequency of spurious signal, power level of spurious signal, frequency of satellite signal and power spectral density of satellite signal;
 subtracting attenuation level of each spurious signal from the power level of each spurious signal to obtain effective signal strength of each spurious signal;
 assigning weights to satellite signal measurements of each satellite; and
 modifying the assigned weight to a satellite signal measurement of a satellite for which the power level of the satellite signal is less than the effective signal strength of a spurious signal of the one or more spurious signals.

7. A method comprising:
 detecting frequency, power level, code phase and doppler frequency of a plurality of satellite signals and frequency and power level of a plurality of spurious signals;

ranking the plurality of spurious signals based on one or more ranking parameters;
processing a first subset of the plurality of spurious signals which are ranked equal or above a threshold rank through a plurality of notch filters; and
processing a second subset of the plurality of spurious signals which are ranked below the threshold rank through a weeding filter.

8. The method of claim 7, wherein ranking the plurality of spurious signals further comprises:
receiving the one or more ranking parameters,
assigning weights to one or more ranking parameters;
estimating a cost associated with one or more ranking parameters;
calculating an optimized cost of each ranking parameter from the estimated cost and assigned weight to the ranking parameter; and
calculating an all-inclusive cost of a spurious signal from the calculated optimized costs of the one or more ranking parameter.

9. The method of claim 7 further comprising monitoring frequency and power level of the plurality of spurious signals and the spurious signals which are being filtered by the notch filter module to dynamically update the rank of the plurality of spurious signals.

10. The method of claim 7, wherein processing the first subset of the plurality of spurious signals through a plurality of notch filters comprises assigning each spurious signal that is ranked equal or above a threshold rank to a notch filter of the plurality of notch filters.

11. The method of claim 7, wherein processing the second subset of the plurality of spurious signals through a weeding filter comprises:
receiving satellite signal measurements of each satellite signal of the one or more satellite signals, wherein the satellite signal measurements is at least one of frequency, power level, and coherent integration duration of a satellite signal;
receiving spurious signal measurements of each spurious signal of the one or more spurious signals, wherein the spurious signal measurements is at least one of frequency and power level of a spurious signal;
receiving attenuation level of each spurious signal with respect to each satellite signal, wherein the attenuation level of each spurious signal is a function of at least one of frequency of spurious signal, power level of spurious signal, frequency of satellite signal and power spectral density of satellite signal;
subtracting attenuation level of each spurious signal from the power level of each spurious signal to obtain effective signal strength of each spurious signal;
assigning weights to satellite signal measurements of each satellite; and
modifying the assigned weight to a satellite signal measurement of a satellite for which the power level of the satellite signal is less than the effective signal strength of a spurious signal of the one or more spurious signals.

12. A global navigation satellite system (GNSS) receiver comprising:
a detection module configured to detect a plurality of satellite signals and a plurality of spurious signals, wherein the detection module is configured to measure the frequency, power level, code phase and doppler frequency of the plurality of satellite signals and frequency and power level of the plurality of spurious signals;
a ranking module coupled to the detection module and configured to rank the plurality of spurious signals based on one or more ranking parameters;
a notch filter module coupled to the ranking module and configured to receive the plurality of satellite signals and the plurality of spurious signals, and wherein the notch filter module is configured to process a first subset of the plurality of spurious signals that are ranked equal or above a threshold rank; and
a weeding filter coupled to the notch filter module and the ranking module and configured to process a second subset of the plurality of spurious signal that are ranked below the threshold rank.

13. The GNSS receiver of claim 12, wherein the ranking module is configured to monitor the frequency and power level of the plurality of spurious signals detected by the detection module and the first subset of the plurality of spurious signals which are being filtered by the notch filter module, and dynamically update the rank of the plurality of spurious signals.

14. The GNSS receiver of claim 12, wherein the ranking module ranks the plurality of spurious signals based on one or more ranking parameters further comprises:
receive the one or more ranking parameters;
assign weights to one or more ranking parameters;
estimate a cost associated with one or more ranking parameters;
calculate an optimized cost of each ranking parameter from the estimated cost and assigned weight to the ranking parameter; and
calculate an all-inclusive cost of a spurious signal from the calculated optimized costs of one or more ranking parameters.

15. The GNSS receiver of claim 12, wherein the notch filter module further comprises a plurality of notch filters and each notch filter is configured to filter a spurious signal that is ranked equal or above a threshold rank.

16. The GNSS receiver of claim 12, wherein the weeding filter is configured to:
receive satellite signal measurements of each satellite signal of the one or more satellite signals, wherein the satellite signal measurements is at least one of frequency, power level, and coherent integration duration of a satellite signal;
receive spurious signal measurements of each spurious signal of the one or more spurious signals, wherein the spurious signal measurements is at least one of frequency and power level of a spurious signal;
receive attenuation level of each spurious signal with respect to each satellite signal, wherein the attenuation level of each spurious signal is a function of at least one of frequency of spurious signal, power level of spurious signal, frequency of satellite signal and power spectral density of satellite signal;
subtract attenuation level of each spurious signal from the power level of each spurious signal to obtain effective signal strength of each spurious signal;
assign weights to satellite signal measurements of each satellite; and
modify the assigned weight to a satellite signal measurement of a satellite for which the power level of the satellite signal is less than the effective signal strength of a spurious signal of the one or more spurious signals.

17. A computing device comprising:
a processing unit;
a memory module;

a receiver receiving a plurality of satellite signals from the plurality of satellites, the receiver comprising:
- a detection module configured to detect a plurality of satellite signals and a plurality of spurious signals, wherein the detection module is configured to measure the frequency, power level, code phase and doppler frequency of the plurality of satellite signals and frequency and power level of the plurality of spurious signals;
- a ranking module coupled to the detection module and configured to rank the plurality of spurious signals based on one or more ranking parameters;
- a notch filter module coupled to the ranking module and configured to receive the plurality of satellite signals and the plurality of spurious signals, and wherein the notch filter module is configured to process a first subset of the plurality of spurious signals that are ranked equal or above a threshold rank; and
- a weeding filter coupled to the notch filter module and the ranking module and configured to process a second subset of the plurality of spurious signal that are ranked below the threshold rank.

18. The computing device of claim 17, wherein the ranking module ranks the plurality of spurious signals based on one or more ranking parameters further comprises:
- receive the one or more ranking parameters;
- assign weights to one or more ranking parameters;
- estimate a cost associated with one or more ranking parameters;
- calculate an optimized cost of each ranking parameter from the estimated cost and assigned weight to the ranking parameter; and
- calculate an all-inclusive cost of a spurious signal from the calculated optimized costs of one or more ranking parameters.

19. The computing device of claim 17, wherein the notch filter module further comprises a plurality of notch filters and each notch filter is configured to filter a spurious signal that is ranked equal or above a threshold rank.

20. The computing device of claim 17, wherein the weeding filter is configured to:
- receive satellite signal measurements of each satellite signal of the one or more satellite signals, wherein the satellite signal measurements is at least one of frequency, power level, and coherent integration duration of a satellite signal;
- receive spurious signal measurements of each spurious signal of the one or more spurious signals, wherein the spurious signal measurements is at least one of frequency and power level of a spurious signal;
- receive attenuation level of each spurious signal with respect to each satellite signal, wherein the attenuation level of each spurious signal is a function of at least one of frequency of spurious signal, power level of spurious signal, frequency of satellite signal and power spectral density of satellite signal;
- subtract attenuation level of each spurious signal from the power level of each spurious signal to obtain effective signal strength of each spurious signal;
- assign weights to satellite signal measurements of each satellite; and
- modify the assigned weight to a satellite signal measurement of a satellite for which the power level of the satellite signal is less than the effective signal strength of a spurious signal of the one or more spurious signals.

* * * * *